(12) United States Patent
Guthrie et al.

(10) Patent No.: US 6,453,541 B1
(45) Date of Patent: Sep. 24, 2002

(54) METHOD AND APPARATUS FOR CENTERING DISCS IN DISC DRIVES

(75) Inventors: Duncan Guthrie, Nr. Sudbury (GB); Soon How Lee, Singapore (SG); Ricky Chong Ho Tan, Johor (MY)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 09/790,458

(22) Filed: Feb. 22, 2001

(30) Foreign Application Priority Data

Feb. 23, 2000 (SG) ...................................... 200001030-6

(51) Int. Cl.[7] .............................................. G11B 5/127
(52) U.S. Cl. ...................................... 29/603.03; 29/759
(58) Field of Search .............................. 29/603.03, 729, 29/732, 737, 757, 759, 760

(56) References Cited

U.S. PATENT DOCUMENTS 6,094,804 A * 8/2000 Chuang et al. .......... 29/603.03
6,158,112 A * 12/2000 Kim et al. ..................... 29/759
6,295,717 B1 * 10/2001 Chuang et al. .......... 29/603.03

* cited by examiner

Primary Examiner—Gregory Huson
Assistant Examiner—Peter deVore
(74) Attorney, Agent, or Firm—Robert B. Martin; Bracewell & Patterson, L.L.P.

(57) ABSTRACT

A method and an apparatus for centering a disc drive assembly are disclosed. The assembly includes a rotational hub of a spindle motor, several annular spacer elements, and several disc platters loosely assembled into a disc pack. The rotational hub, each of the discs, and each of the spacer elements are centered respectively using a corresponding set of three springs as points of contact. The alignment and positioning of the springs are precisely controlled. Once centered, a retaining nut is fastened to a threaded portion of the spindle motor to firmly clamp the disc pack together before withdrawing the springs. Hub centering springs, disc centering springs, and spacer element springs are all adapted to provide the three points of contact for each component of the disc pack.

22 Claims, 10 Drawing Sheets

METHOD AND APPARATUS FOR CENTERING DISCS IN DISC DRIVES

BACKGROUND OF THE INVENTION

1. Technical Field

The present invention relates to the field of disc drive assembly and more particularly to methods and apparatuses for centering discs and other components of disc drives.

2. Description of the Related Art

Imbalance in the components of a disc drive is a significant limitation on the disc drive performance. To reduce the effect of imbalances, a number of techniques have been described, attempting to address this problem. One technique involves determining the imbalance in a disc mass and coupling and then attempting to cancel out this imbalance by adding or removing mass in an opposite direction. Another technique involves forcing the mass imbalances to be offset 180 degrees apart (with pre-calculated value) attempting to balance the mass. While opposing imbalances are supposed to cancel each other out in reality this seldom works.

As in most drive industries, the conventional approach to attempting to overcome imbalances in the assembly of a disc pack is to introduce a balancing station. In the balancing station, the imbalanced plane and coupling are measured, and then masses are added or removed to balance the disc pack. However, disadvantageously this involves more capital investment, additional steps in the process of assembling a disc drive, as well as more space and resource requirements. Still further, disadvantageously the technique of measuring balance and the approach of adding/removing mass has it own limitations and as a result increases the complexity of the assembly process.

U.S. Pat. No. 5,043,973 issued to Ocheltree at al. on Aug. 27, 1991 describes a method of centering a disc with a single contact element using a damping force and a spring force. In this method, external force is applied to a disc producing in an elliptical spin. The contact element is then backed off until the disc is centered. This works with a single disc, but in the case of multiple discs only one disc has a near perfect center while the others do not. Tolerance of the roundness of a disc is a key factor limiting this technique. Thus, not all the discs contact the contact element.

Thus, a need clearly exists for an improved system for eliminating or at least ameliorating mass imbalance in the assembly of a disc pack.

SUMMARY OF THE INVENTION

In accordance with a first aspect of the invention, there is disclosed a method of centering a disc and motor assembly. The assembly includes a rotational hub of a motor, at least one annular spacer element, and at least one annular disc. The at least one annular spacer element and the at least one annular disc are in substantially concentric alignment about the rotational hub. In the method, the rotational hub is centered using three points of contact. Each of the at least one disc is centered using three points of contact applied to the periphery of the at least one disc. Each of the at least one annular spacer element is centered using three points of contact. The alignment and positioning of the points of contact for the three centering steps are precisely controlled. The method may also include the step of fastening a fastening device to the disc and motor assembly to firmly clamp the rotational hub, the at least one annular spacer element, and the at least one annular disc together before withdrawing the three points of contact in each of the three centering steps. Optionally, the fastening device is a retaining nut, and the rotational hub has a threaded portion complementarily formed to the retaining nut for interengagement therebetween.

Preferably, the disc and motor assembly includes at least two discs, a spacer element being located between each adjacent pair of discs. More preferably, the number of discs is five or ten, with corresponding spacers placed between pairs of discs, depending upon the particular disc drive configuration.

Preferably, the three points of contact for the hub-centering step are three motor centering springs. Each of the motor centering springs may include: an annular body; a leaf body being substantially hemispherical and disposed within the annular body, the leaf body having two over rotation stops formed at opposite locations of the leaf body and an overload stop, each of the stops in proximity to an internal edge of the annular body; and a leaf spring connecting the leaf body with the annular body.

Preferably, the three points of contact for the disc centering step for each disc are three disc centering springs. Each of the disc centering springs may include: an annular body; a leaf body being substantially hemispherical and disposed within the annular body, the leaf body having two over-rotation stops formed at opposite locations of the leaf body and an overload stop, each of the stops in proximity to an internal edge of the annular body; and a leaf spring connecting the leaf body with the annular body.

Preferably, the three points of contact for the spacer-element centering step for each spacer element are three spacer-element centering springs. Each of the spacer-element centering springs may include a plate-like member having a substantially circular lobe. The plate-like member further includes a substantially circular inner lobe formed by a groove in the plate-like member, the substantially circular inner lobe having an overload stop formed therein.

In accordance with a second aspect of the invention, there is disclosed an apparatus for centering a disc and motor assembly. The assembly includes a rotational hub of a motor, at least one annular spacer element, and at least one annular disc. The at least one annular spacer element and the at least one annular disc are in substantially concentric alignment about the rotational hub. The apparatus includes: a device for centering the rotational hub using three points of contact; a device for centering each of the at least one disc using three points of contact applied to the periphery of the at least one disc; and a device for centering each of the at least one annular spacer element using three points of contact. The alignment and positioning of the points of contact for the three centering means are precisely controlled.

BRIEF DESCRIPTION OF THE DRAWINGS

A small number of embodiments of the invention are described hereinafter with reference to the drawings, in which.

DETAILED DESCRIPTION OF THE PREFERRED EMBODIMENT

A method and apparatus for centering a disc drive pack are described. In the following description, numerous details are set forth including numbers of disc platters, size of an assembled disc packs and the like, for example. It will be apparent to one skilled in the art, however, that the present invention may be practiced without these specific details. In other instances, well-known features are not described in detail so as not to obscure the present invention.

Figure 1:
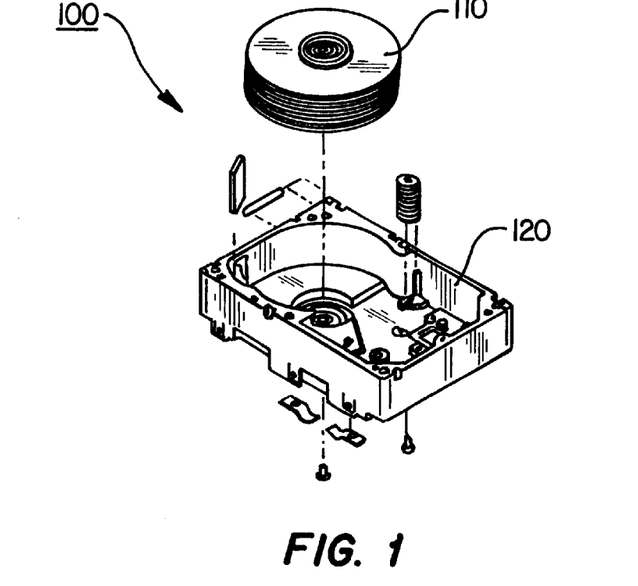
FIG. 1 is an exploded view of a disc drive showing the location of a disc pack within a base casting.

FIG. 1 indicates the location of the disc pack 110 within a base casting 120 of a disc drive 100, where the lid of the disc drive 100 has been removed (not shown). The disc pack 110 is shown in greater detail in FIGS. 2A and 2B, which are top and bottom perspective views, respectively. The disc pack 110 includes a number of disc platters 210, of which there are preferably five or ten. However, other numbers of disc platters may be used without departing from the scope and spirit of the invention. The disc pack 110 further includes a spindle motor 230, about which the platters 210 are arranged by positioning the spindle motor through the central aperture of each disc. The disc platters 210 are separated from one another by means of spacers or spacer element (not shown in FIGS. 2A and 2B).

Figure 2A:
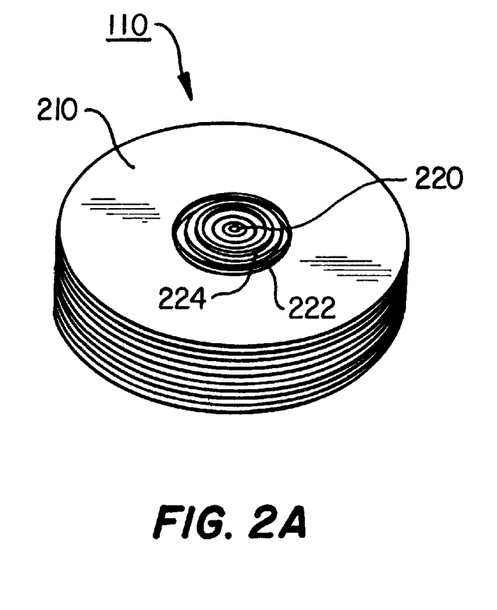
FIGS. 2A and 2B are top and bottom perspective views of the assembled disc pack of FIG. 1.
Figure 2B:
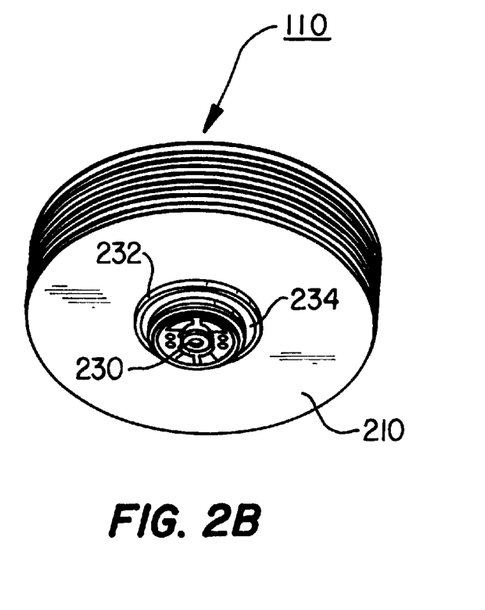

In FIG. 2B, the lower portion 230 of the spindle motor is depicted. The disc platters 210 and interleaved spacer element rest upon a flange 234 of the spindle motor. The motor hub location diameter is indicated by reference numeral 232. In FIG. 2A, the upper center portion 220 of spindle motor is depicted. A load washer 222 rests upon the top platter 210 and a retaining or clamping nut 224 is placed on top of the load washer 222. The retaining nut 224 is screwed on to a threaded portion (not shown) of the spindle motor with a specified load added to the load washer 222 and retaining nut 224 to rigidly bind or clamp the arrangement of disc platters 210 and spacers about the spindle motor to provide the assembled disc pack 110.

Figure 3:
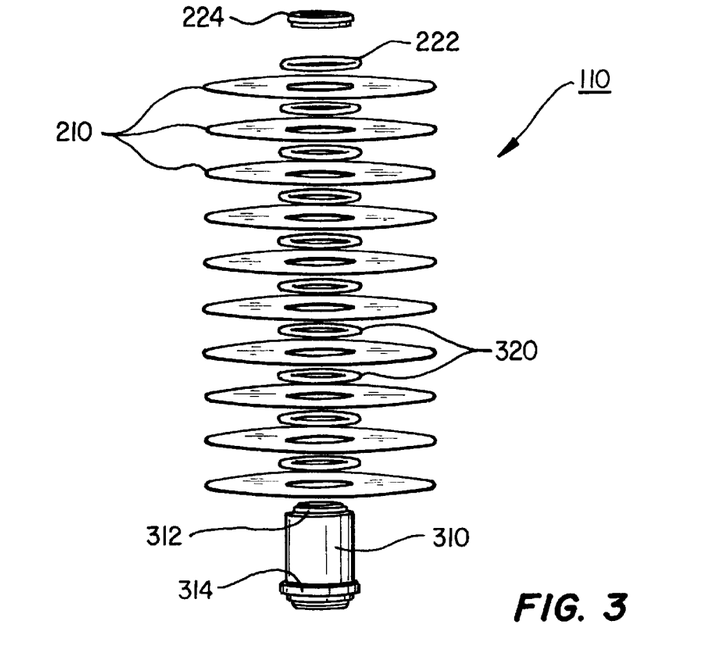
FIG. 3 is an exploded, side view of the disc pack of FIG. 1, including the disc platters, spacers, spindle motor, load washer and clamping nut.

FIG. 3 is an exploded view of the disc pack 110. The spindle motor 310 has a cylindrical rotational hub forming the greatest portion of the spindle motor. At the upper end of the spindle motor 310 is a threaded neck portion 312. Toward the opposite end of the spindle motor 310 is a flange 314 upon which the disc platters 210 and the spacers 320 as an assembly rest. The in-line arrangement of the spindle motor 310, the disc platters 210 and the spacers 320 is indicated by a vertical line representing the central axis passing through each of the components. On the upper surface of the top platter 210, a load washer 222 is situated in this arrangement. A clamping or retaining nut 224 contacts the load washer 222 and can be engaged with the threads 312 of the spindle motor.

Referring to FIG. 1, within the disc drive 100, there are several major components. These components are the motor, the disc, the head stack, the Voice Coil Magnet (VCM) assembly, the spacers, and the clamp that holds the disc and spacers to the motor. The embodiments of the invention are advantageously directed to centering the masses of the discs 210 and spacers 230 with respect to the rotational center of the motor 310 prior to being clamped together into one entity using the clamp ring or nut 224. The resulting assembled entity is referred to as a disc pack 110.

Referring to FIG. 3 again, the disc pack 110 preferably has ten discs 210 and nine spacers 320. However, the embodiments of the invention can be advantageously employed using different numbers of disc and spacers without departing from scope and spirit of the invention. The disc pack 110 is integrated with a head stack (not shown in FIG. 1), which writes servo patterns onto the discs 210. Therefore, it is essential to ensure that there is minimal vibration (imbalance) from the disc pack 110, so that the head stack can write and read back a suitable signal. Consequently, the better the disc pack mass is centered to the center of rotation, the better is the end result of the product (i.e., the disc drive 100).

The imbalance of the disc pack 110 can be caused by a number of factors:

1) Motor imbalance (due to rotor and hub run out, and bearing imperfection);
2) Disc mass and run out;
3) Spacer mass and run out;
4) Clamp ring/nut mass and run out; and
5) Assembly and stack-up tolerances of all the component of the disc pack 110.

Of the five above factors, factors 1 to 4 can be controlled, but the last factor (5), and most significant one, is how you assemble the disc pack together and center its mass. This is the most difficult factor to control and is the major contributor to imbalance in a disc pack 110.

The embodiments of the invention center the disc pack mass so that the disc pack 110 is self-balanced. This results in major savings and advantages over the conventional techniques. In particular, no additional down stream equipment is required and therefore there are savings in equipment investment. Further, there are savings in terms of balancing materials, as these are no longer required as in conventional techniques. Still further, there is also reduced process flow and space utilization.

Besides the forgoing advantages, there are also increases in process efficiency in throughput.

Figure 12A:
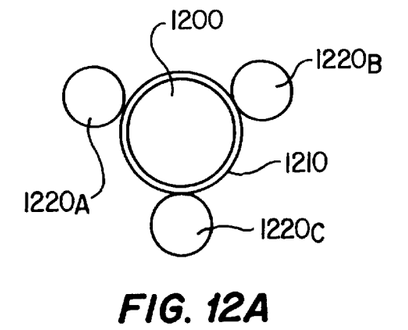
FIGS. 12A, 12B, and 12C are block diagrams illustrating the centering of the motor spindle, a spacer, and a disc, respectively, in accordance with the embodiments of the invention.
Figure 12B:
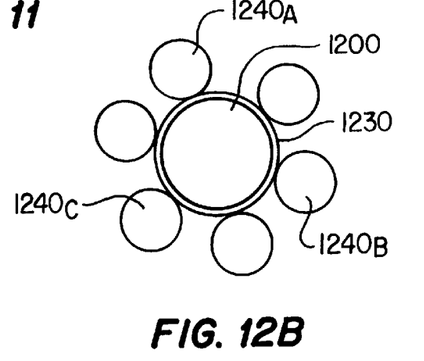
Figure 12C:
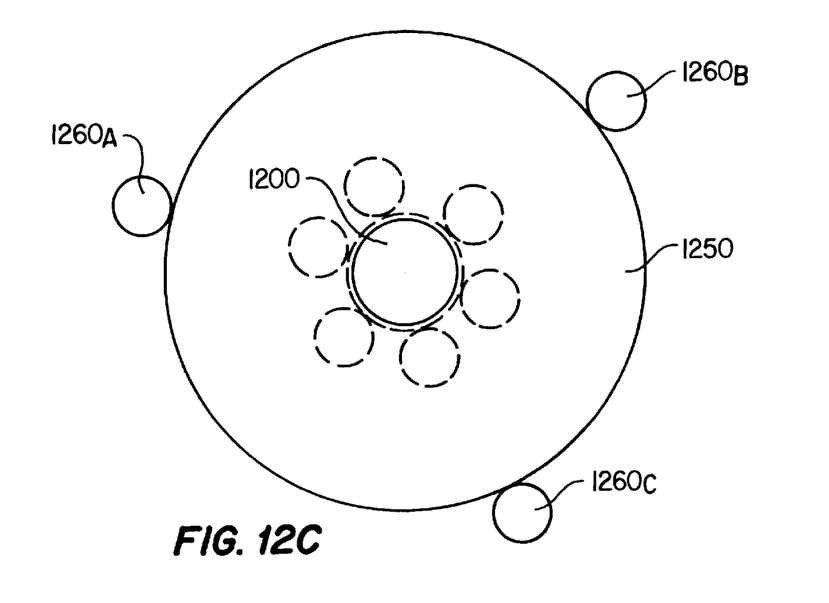
Figure 13:
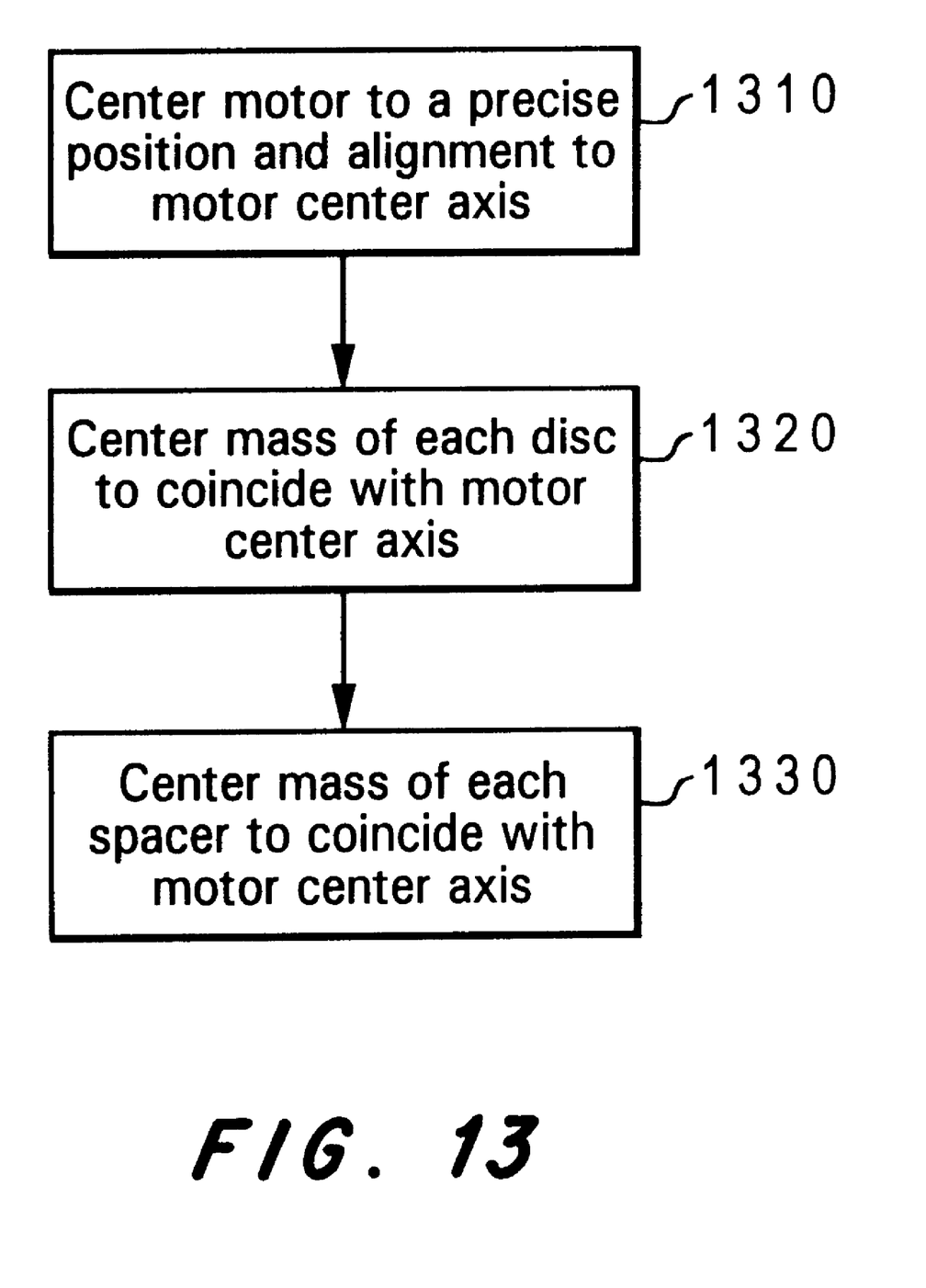
FIG. 13 is a flowchart illustrating a process of centering the components of a disc pack in accordance with the embodiments of the invention.

A broad overview of the embodiments of the invention is provided by the block diagrams of FIGS. 12A–12C and the flow diagram of FIG. 13. Referring first to FIG. 13, a process of centering the disc pack mass is shown. While the steps 1310–1330 are illustrated sequentially, the three steps can be carried out in parallel substantially simultaneously. In step 1310, the motor (in particular the rotational hub) is centered to a precise position and alignment. The longitudinal axis of the motor is lined up to be substantially vertical, while minimizing to the extent possible any imbalance in the motor. This is done using three points of contact applied to a peripheral surface (preferably the flange 314) of the spindle motor. The points of contact are separated preferably by 120 degrees. In step 1320, the mass of each disc 210 is centered to coincide with the motor center axis, again using three points of contact for each disc separated by 120 degrees preferably. Each of the discs is centered by a corresponding set of three such contact points. In step 1330, the mass of each spacer is centered to coincide with the motor center using three points of contact with each of the spacers separated by 120 degrees, preferably.

As an alternative to the flow of FIG. 13, step 1310 may be carried out first and then steps 1320 and 1330 can be carried out in parallel. The disc pack mass centering process of FIG. 13 is now described in further detail with reference to FIGS. 12A–12C.

FIG. 12A is a top plan view of a spindle motor and three points of contact to be centered in step 1310 of FIG. 13. The spindle motor has a rotational hub 1200 and a flange 1210 that protrudes radially. To center the spindle motor, three points of contact 1220A–1220C each separated one from the next adjacent one by 120 degrees or so are precisely brought into contact with the motor flange 1210 so as to precisely align and position the motor. The contact points 1220A–1220C can be brought into contact with the motor and retracted or withdrawn.

Referring to FIG. 12B, the centering of a spacer 1230 is shown in plan view. For ease of illustration, disc platters are omitted from this view. The spacer 1230 is located between two such disc platters (not shown). Because the spacer 1230 is in position above the rotational hub 1200 of the spindle motor, the motor flange 1210 of FIG. 12A is not visible in this view. However, the three points of contact centering the motor mass are depicted in FIG. 12B. Three additional points of contact 1240A–1240C are brought into contact with the spacer 1230 so as to precisely align and position its mass about the motor center axis. FIG. 12B illustrates the functionality of step 1330 of FIG. 13. Again, the points of contact 1240A–1240C can be brought into contact with the spacer 1230 precisely and withdrawn or retracted.

Finally, with the reference to FIG. 12C, the centering of the mass of a disc to coincide with the motor center axis according to step 1320 of FIG. 13 is depicted. To simplify the drawing, only one disc 1250 is shown. The points of contact for centering the motor and the spacers are indicated with dashed line. Likewise, the spacer 1230 is indicated with a dashed line. The disc platter 1250 is centered by bringing the three points of contact 1260A–1260C into contact with the periphery of the disc platter 1250. While the points of contact remain in contact with the motor, spacers and disc thereby centering the disc pack mass, a clamping or retaining nut can be applied to the threaded portion of the spindle motor with a specified load added onto the pack to rigidly clamp the entire disc pack assembly together.

Thus, the centering process according to the embodiments of the invention basically attempts to center and align individual component (disc, spacers, load washer, and clamping nut) to the center of rotation of the motor. This balances the disc pack 110 to an acceptable value without resulting in servo run out problems. As the motor itself is an assembly, there is some degree of imbalance that cannot be corrected using the centering process. All the rest of the components have roundness specifications and mass distributions, which contribute to the total imbalance. Thus, it is impossible to attain zero imbalance, but the embodiments of the invention center all the components and therefore substantially cancel out or reduce the imbalance imperfections of the individual component.

As described hereinafter, the first embodiment of the invention is able to center all components of the disc pack 110 to an average run out of less than 8 microns. This results in a balance yield of better than 90% for 1.0 inch disc pack. To attain 100% yield, the motor inherent imbalance must be significantly reduce or eliminated. The balancing specification for a 1.0 inch high disc pack is a single plane at 0.3 gm-mm with couple at 8 gm-mm2. Currently, the motor inherent imbalance averages at 0.4 gm-mm for 1.0 inch packs and 0.8 gm-mm for 1.6 inch packs.

The first embodiment of the invention is described hereinafter with reference to FIGS. 4–11 and 14–16.

Motor Centering

Figure 4:
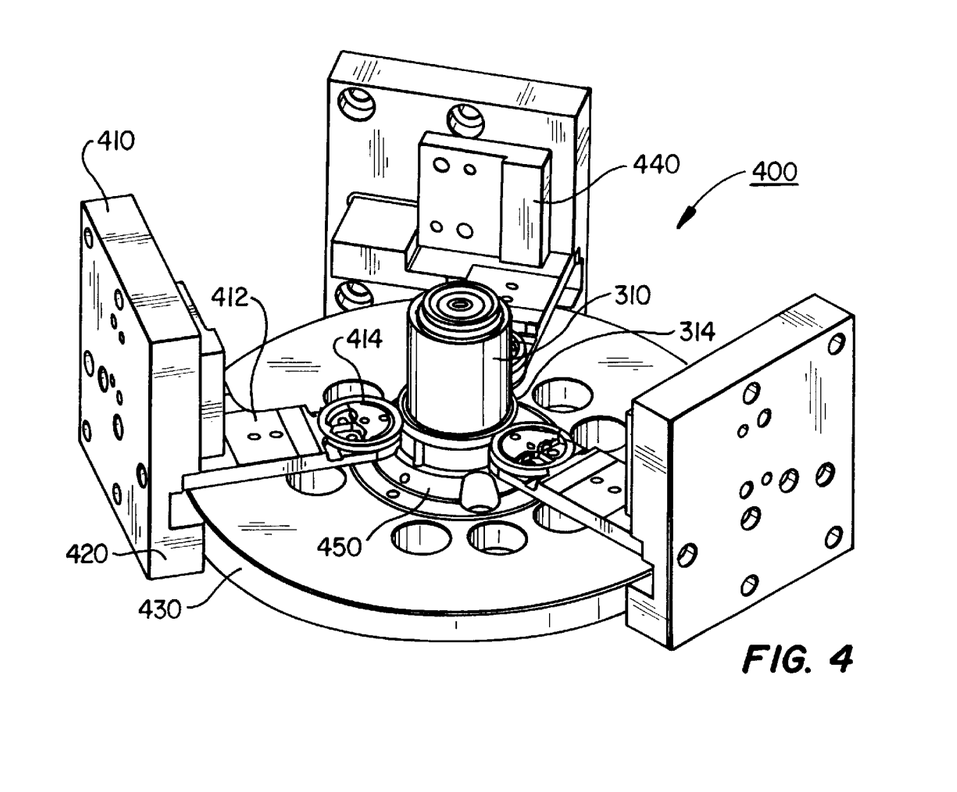
FIG. 4 is a top, perspective view of a portion of a centering box for centering the disc pack of FIG. 1 including motor centering springs in accordance with a first embodiment of the invention.

FIG. 4 is a perspective view of a portion 400 of a centering box for centering a disc pack 110, where only the motor centering springs 414 are shown and other components of the centering box are not shown to simplify the drawings. The central component of the centering box is the circular base 430 that acts as a fixed hard stop. Located around the peripheral edge of the fixed hard stop 430 are three spring support blocks 410. While not shown in FIG. 4, each of the spring support blocks is mounted on a carriage, which is spaced 120 degrees apart from each of the other adjacent carriages and spring support blocks. The back surface of each of the spring support blocks 410 is connected with the carriage. Each of the spring support blocks 410 can be brought into contact with the fixed hardened stop 430 and withdrawn therefrom. The face 420 at the bottom of each spring support block 410 is the point of contact between the spring support block 410 and the fixed hardened stop 430. The face 420 of the spring support block that contacts the fixed hardened stop 430 and the fixed hardened stop 430 itself are precisely ground to within +/− 2 microns with concentricity and parallelism tolerance of 3 microns to insure proper positioning and alignment of the disc pack mass. Projecting outwardly from each of the disc support block 410 towards the central portion of the circular, fixed hardened stop 430 is an arm member 412 that has a motor centering spring 414 at its far end.

In FIG. 4, components of the centering box for centering each of the spacers and disc platters are not shown to simplify the drawing. Likewise, spacers and discs of the disc pack 110 are not shown. However, located in the center of the fixed hardened stop 430 is the spindle motor of a disc pack 110. The spindle motor 310 sits in a motor locator or cupped recess 310 in a substantially upright position. The arrangement of the motor centering spring 414, the arm 412, and the spring support block 410 of each of the spring support blocks 410 is brought into contact with the fixed hardened stop 430. This causes the motor centering springs 414 spaced 120 degrees apart to each come into contact with the radially protruding flange 314 of the spindle motor. In this manner, the mass of the spindle motor 310 is precisely positioned and aligned so as to balance the disc pack mass 110.

Figure 5A:
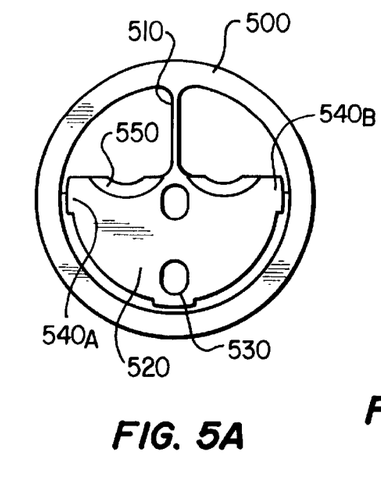
FIGS. 5A, 5B and 5C are plan, side and perspective views of a motor centering spring of FIG. 4 in accordance with the first embodiment of the invention.
Figure 5B:
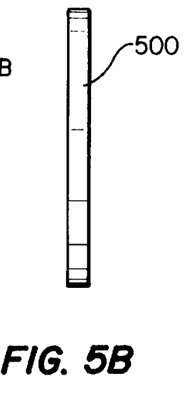
Figure 5C:
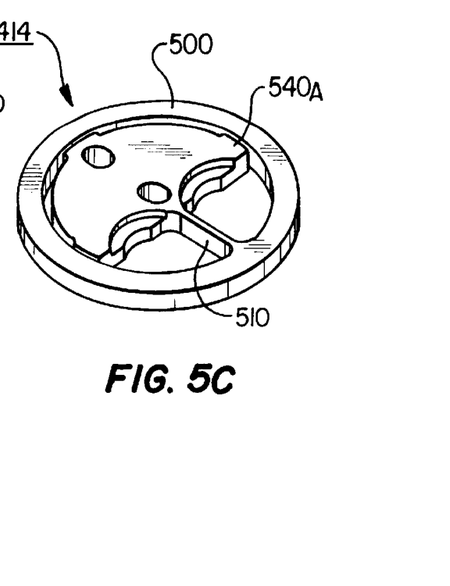

FIGS. 5A–5C are top plan, side, and top perspective views of a single motor centering spring 414. The spring has an outer circular body 500 with an inner leaf body 520 contacted therewith by means of a leaf spring 510. The leaf body is substantially hemispherical. Located in line in the hemispherical leaf body 520 with the leaf spring 510 are two elongated dowel holes. On the opposite side of the leaf body 520 from the leaf spring 510 is an overload stop 530. On the outer periphery of the circular body 500 nearest to the overload stop 530 is the location point for contact with the motor. On opposite sides of the leaf body 520 are over rotation stops 540A and 540B, which are transversely located in respect of an axis passing longitudinally through the leaf spring 510 and the overload stop 530. Under compression or rotation, each of the overload and over rotation stops 530, 540A, 540B can come into contact with the inner surface of the circular body 500. The portion of the outer edge of the circular body 500 nearest to the connection point between the over leaf spring 510 and the circular body 500 is a location point for contact with a jig ground diameter. Two semi-quadrant, counter bore steps 550 are formed in the leaf body 520 on opposite sides of the connecting point between the hemispherical body 520 and the leaf spring 510. Screws can be fastened to the arm 412 to engage the semi-quadrant, counter bore steps 550 of the leaf body 520. As shown in FIG. 4, the motor centering spring 414 rests upon complementarily shaped portion of the arm 412. The motor centering spring 414 is described in greater detail hereinafter with respect to the disc centering spring.

Disc Centering

Figure 6:
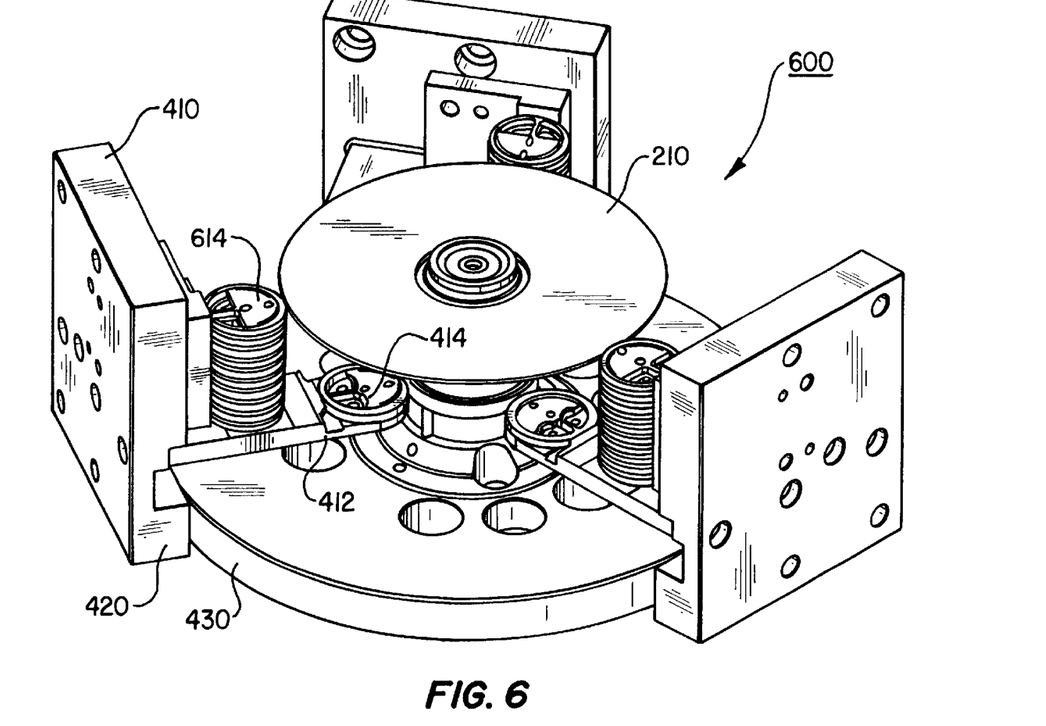
FIG. 6 is a top, perspective view of a portion of the centering box including disc centering springs in accordance with the first embodiment of the invention.

FIG. 6 is a top perspective view illustrating a further portion 600 of the centering block box. Again, the motor centering springs 414 are shown in contact with the flange of the spindle motor precisely positioning and aligning the motor. In addition, a stack or head of disc centering springs 614 is shown also mounted on each of the arms 412. However, to simplify the drawing and make clear the concept of operation, a comb-spring assembly is not shown in FIG. 6. The comb-spring assembly is shown in FIG. 15 and is described below.

The number of disc centering springs 614 in each of the stacks corresponds with the number of disc platters 210 that can be centered. To simplify the drawing of FIG. 6, only a single platter 210 is shown at the top most position of the disc pack. The top most disc centering spring 614 of each the three stacks provides a point of contact for precisely centering and aligning the disc platter 210 with the central axis of the spindle motor. As shown in FIG. 6, one location point of each of the disc centering springs is in contact with the outer periphery of the disc platter 210. An opposite location point for contact with the jig ground reference diameter surface 440 is not shown.

Figure 7A:
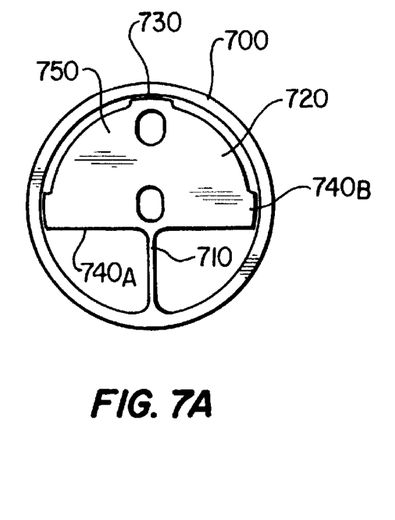
FIGS. 7A, 7B and 7C are plan, side and perspective views of a disc centering spring of FIG. 6 in accordance with the first embodiment of the invention.
Figure 7B:
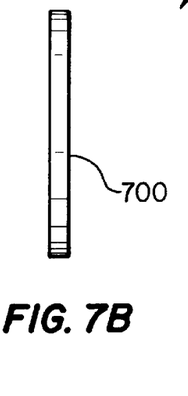
Figure 7C:
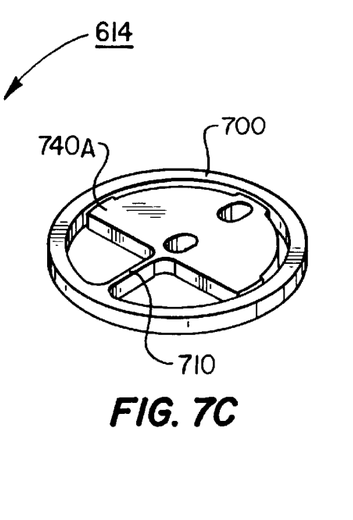

FIGS. 7A–7C are top plan, side, and top perspective views of a disc centering spring 614. The features of the disc centering spring 614 are substantially the same as those of the motor centering spring 414, except that the disc centering 614 does not have semi-quadrant, counter bore steps 550. The disc centering spring 614 has an outer annular body 700 connected with an inner leaf body 750 by a leaf spring 710. The leaf body 750 also has two elongated dowel holes. The leaf body 750 also has over rotation stops 740A and 740B and an over load stop 730, arranged in a similar manner to those of the motor centering spring 414.

Figure 15:
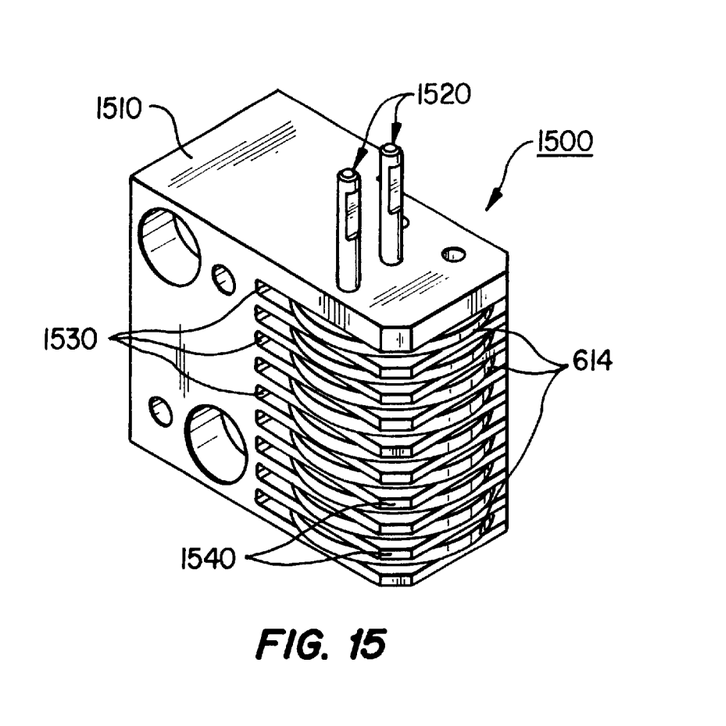
FIG. 15 is a detailed perspective view illustrating a comb-spring assembly for the disc centering springs of FIG. 6.

Referring to FIG. 15, a comb-spring assembly 1500 for housing the disc centering springs 614 is shown. The assembly 1500 includes a box-like housing 1510 made of metal with a comb-like arrangement of fingers 1540 and slots 1530 at one side. Fitted into the slots 1530 are the disc centering springs 614. The assembly 1500 further includes two dowels 1520 passing through the fingers 1540 of the housing 1500 and dowel holes of each spring 614 (shown in FIGS. 7A and 7C). This comb-spring assembly 1500 can be fastened to the inner sides of the spring support blocks 410, resting upon the corresponding arm 412, which have holes for receiving the dowels 1520 as well. In FIG. 15, the front, right side holds the springs 614. The rear portion of the housing 1510 (adjacent the reference number 1500) is the part that is fastened to the spring support blocks 410 of FIG. 4.

The motor centering springs 414 and the disc centering springs 614 have different dimensions, but follow the same basic design principle. The spring design has two parts: the inner part 520, 720 is used for location, while the outer part 500, 700 is flexible and positions the disc/motor. Important features of the spring design for the motor centering spring 414 and the disc centering spring 614 are set out hereinafter. Firstly, the spring rate should be as high as possible and is calculated by the formula given below in Equation 1. Secondly, the faces of the springs that contact the disc and the jig ground reference diameter are curved (part of a cylindrical body). This is a key feature of the spring allowing the spring to roll and thus eliminating friction. Thirdly, the inner part of the spring is connected to the motor centering head by two dowels working in the slot or holes of the leaf body 520, 720. This allows the spring to move freely in the direction radial to the disc pack only. Fourthly, the connection between the inner part 520, 720 and the outer part 500, 700 is flexible (i.e., leaf spring 510, 710) allowing the spring 414, 614 to roll to a few degrees of a minimum constraint. Once the spring is withdrawn, the leaf spring 510, 710 ensures that the outer part 500, 700 of the spring returns to its initial position. Fifthly, the outer portion 500, 700 of the springs 414, 614 is protected against overload by an overload stop, 530, 730. Sixthly, the leaf springs 510, 710 are protected against over rotation by the over rotation stops 540A, 540B and 740A, 740B. Seventhly, the springs 414, 614 are preferably manufactured by wire cutting and in sets of three. Eighthly, the springs 414, 614 are assembled or replaced in sets of three. After replacement, there is no requirement for subsequent setting or adjustment.

The positioning stiffness for the component (i.e., motor or disc) is maximized when the spring rate is at the maximum. The maximum spring rate is define by the following:

$$\text{Rate (N/mm)} = F_{max}/(((D_{max}-D_{min})/2)+C_{min}), \quad (1)$$

where $D_{max}$ is the maximum possible diameter of the disc (mm), $D_{min}$ is the minimum possible disc diameter (mm), $C_{min}$ is the minimum required spring compression (mm), and $F_{max}$ is the maximum allowable force to be applied to the disc circumference by a component of the spring's dimension and is derived by experimentation (N). $C_{min}$ is required to allow for manufacturing tolerances within the centering box and the springs themselves. Typically, $C_{min}$ has a value between 0.010 mm and 0.020 mm.

Preferably, each disc centering spring 614 is designed at 30 N spring force, while the motor centering spring 414 is designed at 60 N spring force. Beside their dimensional differences, the motor centering spring 414 has the two semi-quadrant counter bore steps 550. This allow a screw head to hold the motor centering spring 414 in position while the motor centering spring 414 centers the motor.

For the disc centering springs 614, experiments have been conducted to determine the force allowable to compress on the outer diameter of the disc. A force of 30 N is appropriate for the load application. The experimentation was done using an aluminum disc so that no indentation occurred. For the motor centering spring 414, a higher load can be used since the material of the motor flange is made of stainless steel. Thus, the amount of load can be doubled to that of the disc allowable load and set out at 60 N. There is a great deal of the similarity between the disc and motor centering springs, with the most obvious difference being in their thickness. Characteristics of the motor centering spring include that the motor centering spring can roll upon contact and there is a hard stop feature on the motor centering spring to prevent the spring from over-rotation.

The leaf springs 510, 710 in the spring design enable the outer part 500, 700 of each spring to return to its initial position with two dowels pin located in the slot in the central leaf body 520, 720. There are preferably ten disc springs assembled in a block. Two long dowel pins are used to go through the two slots located in the spring and the block. Without these two dowels pins, the outer part 500, 700 of the spring is not able to return to its initial position.

Preferably, for the disc centering spring, the following parameters are used to fix the spring rate calculated by Equation 1: Dmax=85.05, Dmin=84.95, Cmin=0.015, and Fmax=30 N. Thus, the spring rate of the disc centering spring is equal to 461.5 N/mm. For the motor centering spring 414, the parameters are Dmax=29.025, Dmin=28.975, Cmin=0.015, and Fmax=60 N. Thus, spring rate of the motor centering spring is equal 500 N/mm.

Spacer Centering

Figure 8:
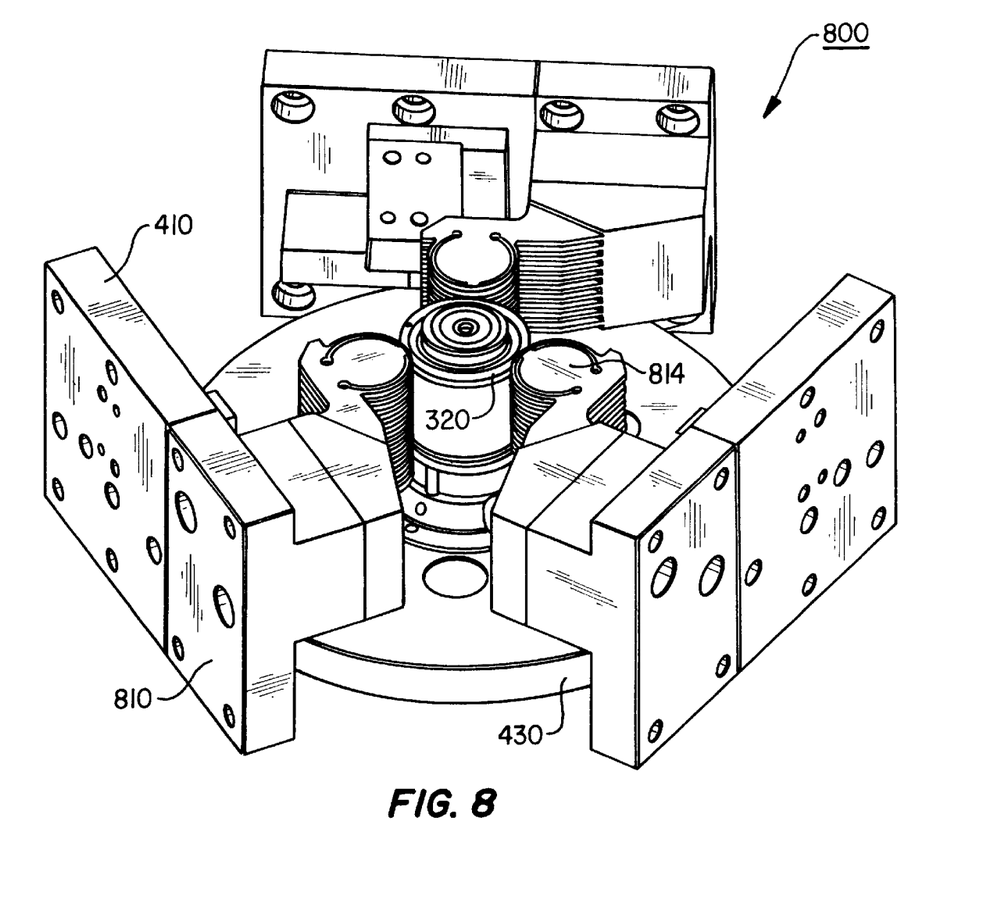
FIG. 8 is a top, perspective view of a portion of the centering box including spacer centering springs in accordance with the first embodiment of the invention.

FIG. 8 is a top perspective view of a portion 800 of the centering block box, illustrating the positioning of the spacer centering springs 814. To simplify the drawing, disc platters 210 and motor and disc centering springs 414, 614 are not illustrated. A second spring support block 810 is connected in line with the first spring support block 410 for each carriage (not shown). Projecting inwardly from the second spring support block 810 are spacer centering springs 814 forming part of a bent arm structure. A single spacer 320 is illustrated with the top most three spacer centering springs 814 contacting the spacer 120( apart.

Figures 9A, 9B, 10:
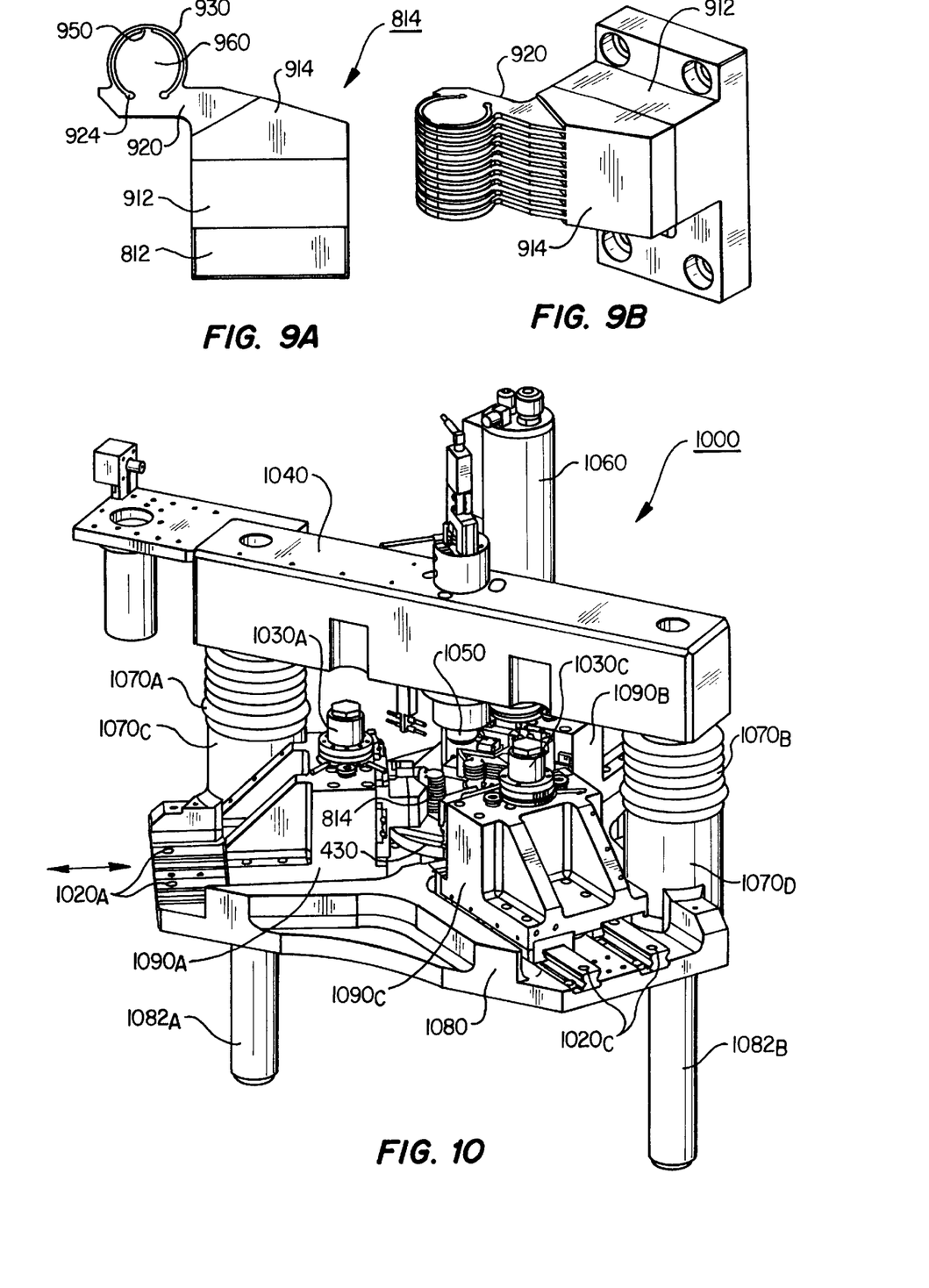
FIGS. 9A and 9B are top plan and perspective views of a disc centering spring of FIG. 8 in accordance with the first embodiment of the invention.
FIG. 10 is a top, perspective view of the complete centering box in accordance with the first embodiment of the invention.

FIGS. 9A and 9B are top plan and top perspective views, respectively, of the spacer centering spring 814 and related assembly. From the second spring support block 812, a rectangular portion 912 and an angled section 914 form part of the bent arm structure. The spacer centering spring 814 further includes an angled part 920 that forms the spacer centering spring 814. As indicated in FIG. 9B, the group of spacer centering spring 814 forms a comb-like structure protruding from the angled portion 914. The spacer centering spring 814 itself is a lobe-like structure. Similar to the other spring structures, the spacer centering spring 814 has an outer part 930 and in inner part 960. The inner and outer parts 960, 950 form a substantially circular group that is not closed, but instead are defined by a circular aperture 924. Also, an overload stop 950 is formed in the periphery the inner part 960. The upper edge of the outer part 930 closest to the overload stop 950 is the location point where the spacer centering spring 814 contacts with a spacer during centering. The overload stop 950 is again used to stop the spring from becoming overly compressed.

The overall dimensions of the assembly shown in FIGS. 9A and 9B are within required control tolerances of 5 microns. The side and back portions of the second spring support block 812 are datum surfaces for mounting the spacer centering spring block onto a carriage (not shown). As shown in FIG. 9B, there are preferably ten spacer centering springs. The ten spacer centering springs 814 are preferably wire cut from one block to insure uniformity. Gaps exist in the comb like structure of the spacer centering springs to allow clearance between discs. The assembly shown in FIGS. 9A and 9B is designed to ensure that the spacer centering springs are able to reach spacers 320 between disc and do not cause any scratches onto the surface of such discs.

Spacer centering springs 814 do not have roll features and are more sensitive to component variation. However, due to the mass distribution, the impact on overall imbalance is quite small. Important features of the spacer centering springs include the following. Firstly, the springs are manufactured preferably by wire cutting from a single piece of hardened stainless steel. Secondly, each spring has overload protection to protect the spring from becoming overly compressed. Thirdly, the dimensions are controlled within high tolerances. The design of the spacer-centering spring 814 permits the spring to flex a little compared to the motor and disc centering springs 414, 614. As the spacer elements 320 are made of stainless steel and have a thickness preferably of 2 mm, the spacer 320 withstands the load applied by the spacer centering spring 814, which is preferably 60 N or more. The spring rate for the spacer centering springs 814 is higher. Preferably, the spring rate is 2000 N/mm.

Centering Box

FIGS. 4–9 collectively illustrate the centering box implemented by the first embodiment of the invention. The centering box is the hub of the disc pack mass centering process. The capability of getting a balanced disc pack depends heavily on the functionality of this device. The process of assembling the centering box is important. Special skill and knowledge of precision machining are involved. The following constitute important parameters to obtain a well performing centering box. Firstly, all the component critical to positioning the motor, disc and spacers are arranged symmetrically around the location for the motor. This ensures that the assembly is not sensitive to temperature changes. Secondly, the centering box is mounted on a hub of only 140 mm in diameter. This ensures that all the assembly loads are transferred directly from the motor pedestal through the mounting hub to this pedestal and do not cause relative bending of the centering fingers or arms in the centering box. Thirdly, the mounting of the centering box to a hub ensures that if there is any deflection of the machine, the disc pack in the centering box reacts as a single entity and the performance of the centering of the disc pack is not affected or is at least minimized. Fourthly, the mounting of the centering box to a hub also helps to isolate the centering box from external vibrations. Fifthly, the special rings are able to accommodate slight variation of tolerances in all the disc, spacers, load washers and motor hub.

FIG. 10 is a top perspective view of the centering box assembly 1000. In the central portion of the centering box 1000, the spacer centering springs 814 and the fixed hardened stop 430 can be seen. Each of the first and second spring supporting blocks 812 are connected to a corresponding carriage 1090A–1090C. The carriages 1090A–1090C are arranged 120( apart and are connected to a fabricated base plate 1080 by corresponding pairs of precision linear guide rails 1020A–1020C. A horizontal double-headed arrow indicates forward and backward movement that is possible for carriage 1090A in the corresponding motor, disc and spacer centering spring. The same motion applies to the other two carriages.

The centering box 1000 also has two precision linear guides 1082A, 1082B. A beam 1040 extends between the upper end of the precision linear guide 1082A and 1082B. The centering box 1000 also includes a motor 1060 for driving a clamping nut in connection with a load application head 1050 that projects downwardly from the bottom surface of the beam 1040. The load applications head 1050 is used to fasten a clamping or loading nut onto a disc pack assembly, once the disc pack mass has been centered. A specific axial load can be applied to a load washer of the disc pack, reacting this against the motor hub and then the nut is tightened to a required torque. This is a pack holding force. A measurement of the compression of the load washer is taken by means of a deflection reading preferably. Deflection is a form of measurement to correlate a residual holding force of the load washer/clamping nut that ensures the assembled pack of discs do not shift under a static shock impact.

An overload centering protection device 1030A–1030C projects downwardly through a respective one of the corresponding carriages 1090A–1090C. Initially, the carriages 1090A–1090C are in a retracted position removed from contact with the fixed hardened stop 430, so that a partially assembled but unbalanced disc pack 110 can be positioned in the center of the base 430. The carriages 1090A–1090C are then simultaneously moved forward and bring the motor, disc and spacer springs into contact with the corresponding motor flange, disc, and spacer element. In this position, the load application head 1050 fastens a clamping or retaining nut onto the threaded portion of the spindle motor so as to firmly fasten the components of the disc pack together.

The centering process implemented by the centering box 1000 locates the motor, discs and spacers using sets of three stainless steel springs. The location of each spring is arranged to act on the circumference of the component at points equally spaced at 120. The outer location of each spring is in contact with a jig ground reference diameter. The springs are designed to have a high rate, as described above. After a small compression is imposed on the spring, precise location of the component is achieved by the springs moving until the forces in all three spring are balanced. If the component is now replaced by one of with different diameter, the component again moves until all the forces in the spring are equal but of different magnitude. In this way, the geometric center of the discs is always located at the same spatial position irrespective of the diameter of the component. The diameter of the component must be within the design range of compression of the spring.

The centering box 1000 is constructed in two levels. On the lower level, the three carriages 1090A–1090C run along a pair of precision linear guides 1020A–1020C that are arranged 120( radially around a location feature for the disc pack. The linear guides 1020A–1020C are mounted the base plate 1080. The lower side of this plate connects directly to the location features on the centering tool mounted on the harmonic drive 1612 of FIG. 16 with two precision linear guides 1082A & 1082B on the sides. Again, on the inner face of each carriage 1090A–1090C is mounted a disc centering head and a spacer centering head (see FIGS. 6 and 8). The disc centering head also has the further feature of motor centering springs, which are used to locate and center the motor. Carriages and therefore the head are driven, through cam follower bearings, to move in a radial direction by a cam 1100 of FIG. 11.

Figure 11:
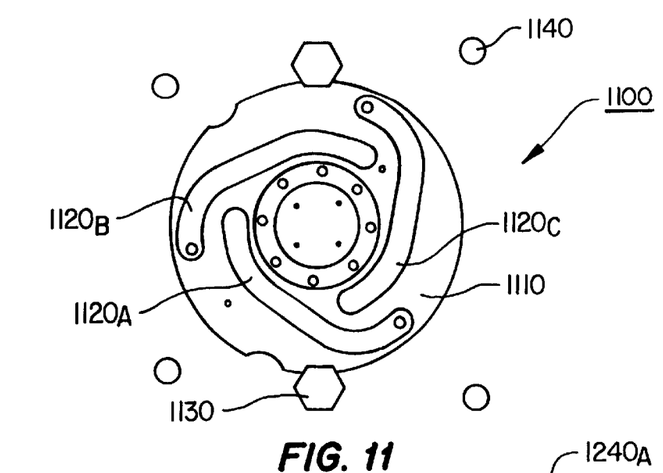
FIG. 11 is a plan view of a cam for controlling precisely the positioning and alignment of the motor, disc, and spacer centering springs in accordance with the first embodiment of the invention.

FIG. 11 is a plan view of a cam 1100 used to roughly position the carriages 1090A–1090C. The cam 1100 includes three grooves 1120A–1120C formed in a plate 1110. The cam 1110 is used for course positioning of the disc, a spacer, and motor centering heads. The precise positioning of the heads is achieved by driving the heads against the fixed hardened stop 430. The course is determined precisely for the centering motion. A further mechanism within each carriage controls the load applied to the hardened stop 430. This mechanism, an eccentric assembly, uses a torsion spring to control the movement of the carriage by its overload and underload sensor protection.

The upper level of the centering box 1000 provides the vertically movable beam 1040 guided by the precision linear guide 1082A & 1082B. The two precision linear guides 1082A & 1082B have spring members 1070A–1070B at the upper portion in connection with the beam 1040. The moveable beam 1040 is used to apply the necessary load to the disc pack being centered as described herein before. The mechanism for driving the nut is incorporated within the moveable beam 1040. The moveable beam 1040 is driven by a servo motor with timing pulley belt and pulley mounted on a linear lead screw. This mechanism is connected to the beam clamp drive 1616 with end rod links 1614 of FIG. 16, which come with a load, allowing any misalignment between the clamp assembly in the tool 1400 of FIG. 14.

The two columns formed by precision linear guides 1082A and 1082B connecting with the over beam 1040 are mounted onto the base 1080 through springs 1070A & 1070B. The pillars 1070C and 1070D are welded onto the base 1080. The final assembly requires jig grinding/machining to attend perpendicularity and parallelism. To ensure that "external" factors do not influence the performance of the tool 1400 of FIG. 14, the tool is built around the rigid and stiff base and beam. All precise datum surfaces are ground to sub-micron accuracy after assembly to avoid assembly stack-up tolerance. In the column, a ball pushing cage assembly is contained that guides the rod which is attached to the beam 1040.

A support motor and the three carriages 1090A–1090C, on the base 1080, are jig ground/machined to ensure that they are well centered. The load cone 1050 is centered with respect to the center of the support motor assembly onto the base 1080. This requires a concentricity gauge and jig to do the concentricity adjustment. The disc pack sits on the support where the nut/load washer is fastened on to the disc pack. Preferably, to ensure that the disc pack is maintained in a horizontal position, a camera system (not shown) is used to check and ensure that the disc rests horizontally. There is no mechanism to hold the disc in a horizontal position until the load cone 1050 is applied on top of the load washer of the assembled disc pack for not fastening.

Figure 14:
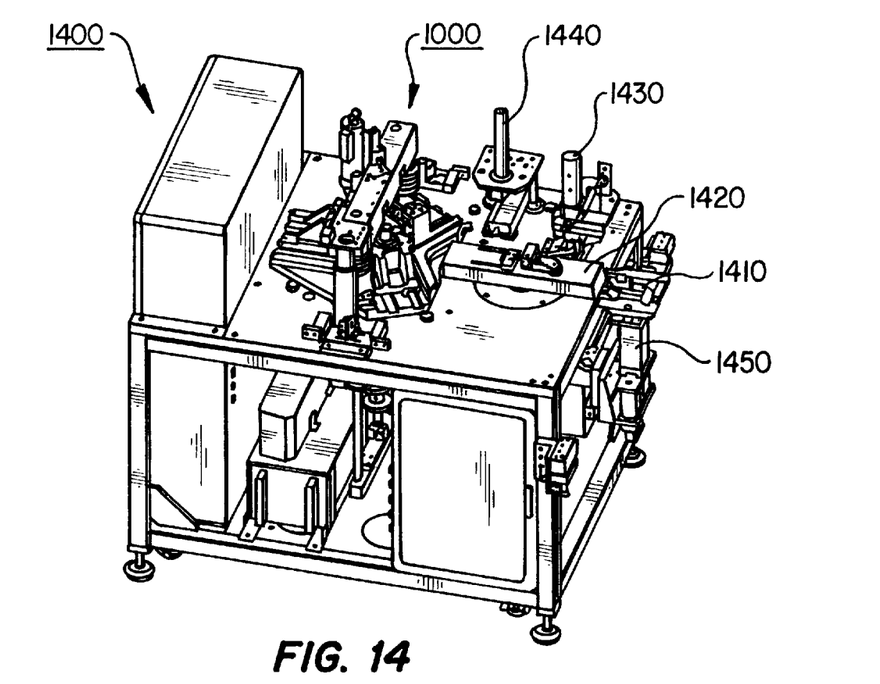
FIG. 14 is a perspective view of an apparatus or tool utilizing the centering box of FIGS. 4–11.
Figure 16:
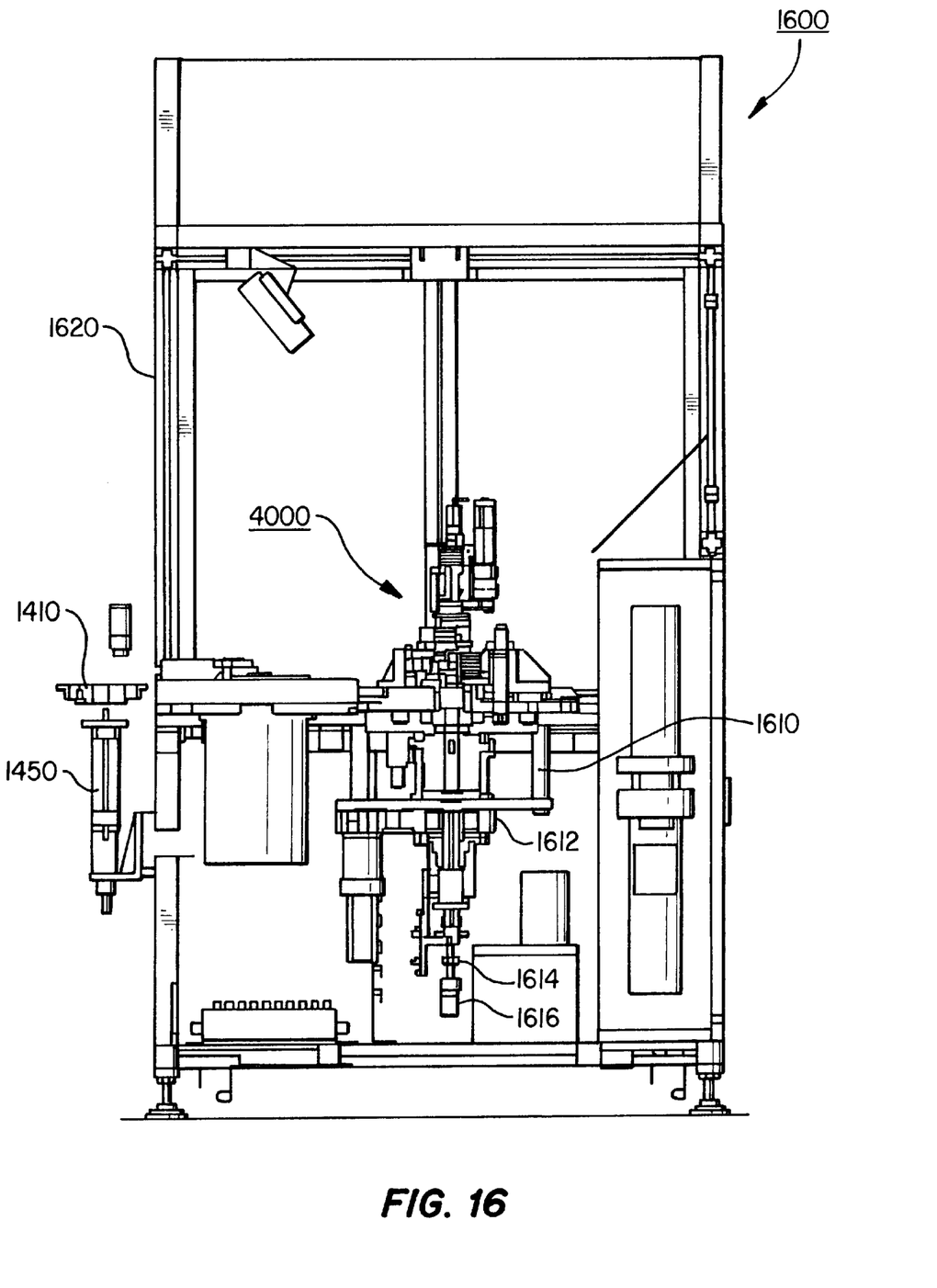
FIG. 16 is a side view of the apparatus or tool of FIG. 14 housed in a cabinet.

FIG. 14 is a perspective view of an apparatus or tool 1400 incorporating the centering box 1000. FIG. 16 is a corresponding side view of the apparatus or tool 1400 in a cabinet. A transport mechanism 1410 forming part of the conveyer system (not shown) is coupled to this apparatus 1400 to transfer disc packs past the tool and to be removed momentarily by a boat or pallet. A cybeq robot (arm) 1420 capable of turning 180( is used to transfer a disc pack/pallet in and out of the tool 1400 from the conveyer 1410 and the centering box 1000. A nut feeding assembly 1440 feeds a nut singularly for the robot end effector to pick up the nut and transfer the nut to the nut driving assembly. A load washer feeding assembly 1430 is also used to feed a washer singularly for the robot end effector to pick up the washer and placed it onto an unclamped disc pack 110 (not shown). The tool also includes a lifter 1450 to lift up the boat palette for the robot transfer 1420. The nut driving assembly has two functions. These assembly is attached to a beam where it is driven by a harmonic drive system to a lead screw. The assembly enables the load cone 1050 where the nut driving is located, to apply an actual load onto the load washer to a specified load. This ensures that the disc pack is under a certain residual load before the nut driving assembly fastens the nut onto the pack.

Figure 17:
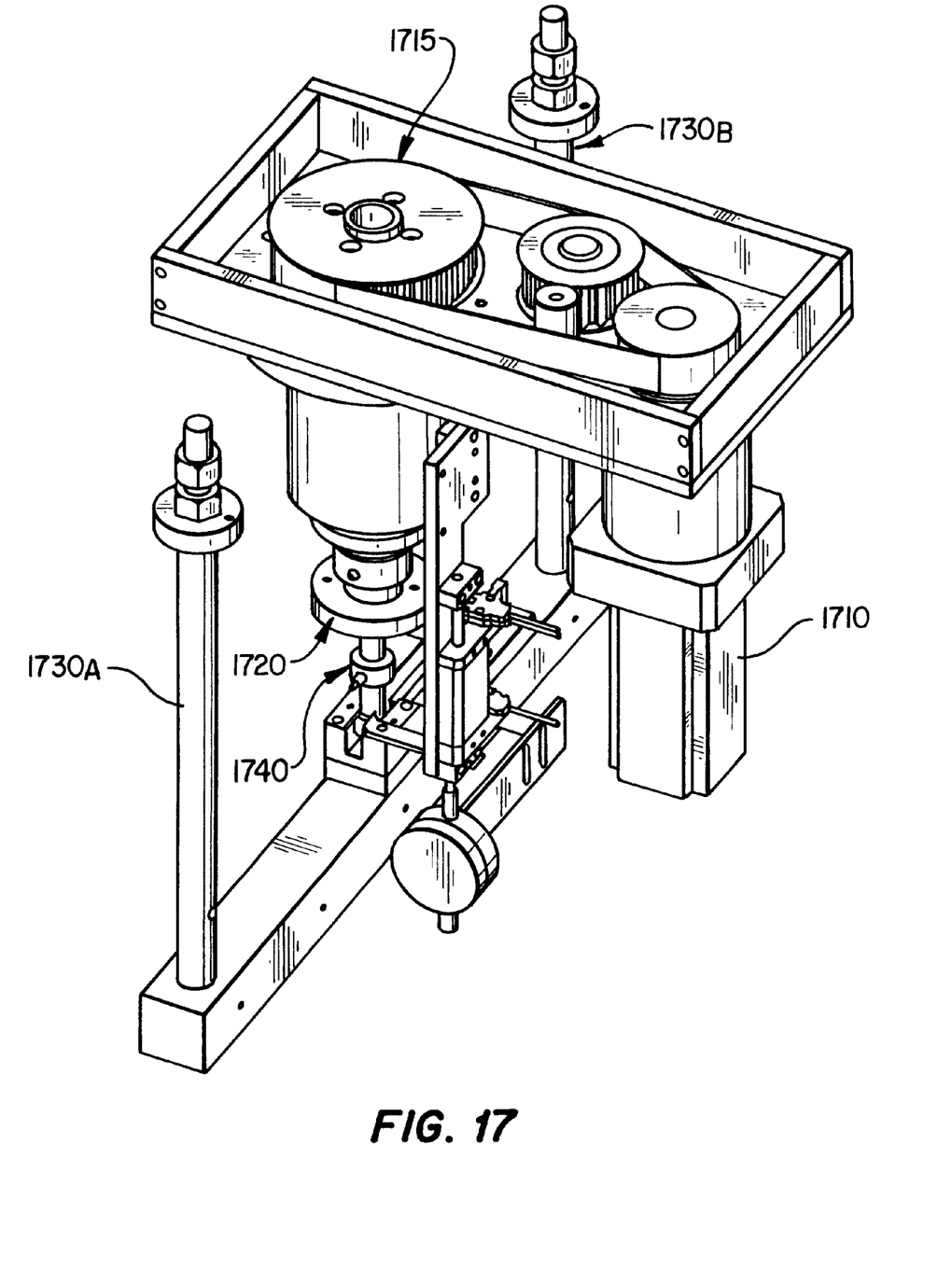
FIG. 17 is a perspective view of the lifter drive for the load beam.

Referring to FIG. 16, the underside of the tool below the base plate is depicted. The tool 1400 is enclosed in a cabinet 1620 of the entire assembly 1600. Beneath the base plate, there are four supporting bars 1610 and the harmonic drive 1612 mentioned above. Also, end rods link 1614 to the load cell and a beam damp drive 1616. FIG. 17 is a detailed view of this underside of the tool. A motor 1710 (preferably a Yaskawa motor) drives a pulley 1715 to on the Thk linear ball motion unit 1720 to lift/lower the beam 1040 of FIG. 10. This is the drive unit that drives the load to the pack 110. The stainless steel rods 1730A and 1730B are linked to the linear precision guides 1082A and 1082B of FIG. 10. There is also a load cell 1740 to measure the load applied onto the disc pack 110.

The embodiments of the invention have a number of advantages. Firstly, the embodiments provide unique centering springs. The centering springs have the ability to roll in order to maintain a contact point while allowing a relative motion which will generate friction, disc or spacer translation motion and allows them to no longer be in center. Secondly, the embodiments provide the ability to stack multiple springs into a stack and work within a very tight space limitation without scratching and touching any disc. Thirdly, the embodiments provide the ability to perform a quick change of process without affecting tolerances. Fourthly, the embodiments provide the ability to center a motor, discs and spacers of a disc pack.

Thus, a method and an apparatus for centering discs and other components of disc drives are disclosed. While only a small number of embodiments are described, it will be apparent to those skilled in the art, in view of this disclosure, that numerous changes and/or modifications can be made without departing from the scope and spirit of the invention.

What is claimed is:

1. A method of centering a disc and motor assembly, the assembly having a rotational hub of a motor, at least one annular spacer element, and at least one disc, the at least one annular spacer element and the at least one disc being in substantially concentric alignment about the rotational hub, the method comprising the steps of:

centering the rotational hub using points of contact;
   centering the at least one disc using points of contact applied to a periphery of the at least one disc;
   centering the at least one annular spacer element using points of contact;
   wherein the alignment and positioning of the points of contact for the three centering steps are precisely controlled.

2. The method according to claim 1, further comprising the step of fastening a fastening device to the disc and motor assembly to clamp the rotational hub, the at least one annular spacer element, and the at least one disc together before withdrawing the points of contact in each of the three centering steps.

3. The method according to claim 2, wherein the fastening device is a retaining nut and the rotational hub has a threaded portion that is complementary to the retaining nut.

4. The method according to claim 1, wherein the disc and motor assembly comprises at least two discs, and wherein a spacer element is located between each adjacent pair of discs.

5. The method according to claim 1, wherein the points of contact for the hub-centering step are three motor centering springs.

6. The method according to claim 5, wherein each of the motor centering springs comprises:

an annular body;
   a leaf body being substantially hemispherical and disposed within the annular body, the leaf body having two over-rotation stops formed at opposite locations of the leaf body and an overload stop, each of the stops being in proximity to an internal edge of the annular body; and
   a leaf spring connecting the leaf body with the annular body.

7. The method according to claim 1, wherein the points of contact for the disc centering step for the at least one disc are three disc centering springs.

8. The method according to claim 7, wherein each of the disc centering springs comprises:

an annular body;
   a leaf body being substantially hemispherical and disposed within the annular body, the leaf body having two over-rotation stops formed at opposite locations of the leaf body and an overload stop, each of the stops in proximity to an internal edge of the annular body; and
   a leaf spring connecting the leaf body with the annular body.

9. The method according to claim 1, wherein the points of contact for the spacer-element centering step for the at least one spacer element are three spacer-element centering springs.

10. The method according to claim 9, wherein each of the spacer-element centering springs comprises:

a plate-like member having a substantially circular lobe, the plate-like member further comprising a substantially circular inner lobe formed by a groove in the plate-like member, the substantially circular inner lobe having an overload stop formed therein.

11. The method according to claim 1, wherein adjacent ones of the points of contact are separated by 120 degrees.

12. An apparatus for centering a disc and motor assembly, the assembly comprising a rotational hub of a motor, at least one annular spacer element, and at least one disc, the at least one annular spacer element and the at least one disc being in substantially concentric alignment about the rotational hub, the apparatus comprising:

means for centering the rotational hub using points of contact;
    means for centering the at least one disc using points of contact applied to a periphery of the at least one disc;
    means for centering the at least one annular spacer element using points of contact; and wherein
    the alignment and positioning of the points of contact for the three centering means are precisely controlled.

13. The apparatus according to claim 12, further comprising means for fastening a fastening device to the disc and motor assembly to clamp the rotational hub, the at least one annular spacer element, and the at least one disc together before withdrawing the points of contact in each of the three centering means.

14. The apparatus according to claim 13, wherein the fastening device is a retaining nut and the rotational hub has a threaded portion that is complementary to the retaining nut.

15. The apparatus according to claim 12, wherein the disc and motor assembly comprises at least two discs, and a spacer element between each adjacent pair of discs.

16. The apparatus according to claim 12, wherein the points of contact for the hub centering means are three motor centering springs.

17. The apparatus according to claim 16, wherein each of the motor-centering springs comprises:

an annular body;

a leaf body being substantially hemispherical and disposed within the annular body, the leaf body having two over-rotation stops formed at opposite locations of the leaf body and an overload stop, each of the stops in proximity to an internal edge of the annular body; and a leaf spring connecting the leaf body with the annular body.

18. The apparatus according to claim 12, wherein the points of contact for the disc centering means for the at least one disc are three disc centering springs.

19. The apparatus according to claim 18, wherein each of the disc-centering springs comprises:

an annular body;

a leaf body being substantially hemispherical and disposed within the annular body, the leaf body having two over-rotation stops formed at opposite locations of the leaf body and an overload stop, each of the stops in proximity to an internal edge of the annular body; and a leaf spring connecting the leaf body with the annular body.

20. The apparatus according to claim 12, wherein the points of contact for the spacer element centering means for each spacer element are three spacer element centering springs.

21. The apparatus according to claim 20, wherein each of the spacer-element-centering springs has a plate-like member having a substantially circular lobe, the plate-like member further comprising a substantially circular inner lobe formed by a groove in the plate-like member, the substantially circular inner lobe having an overload stop formed therein.

22. The apparatus according to claim 12, wherein adjacent ones of the points of contact are separated by 120 degrees.

* * * * *